N. Thompson,
Nut Lock.
No. 100,214. Patented Feb. 22, 1870.
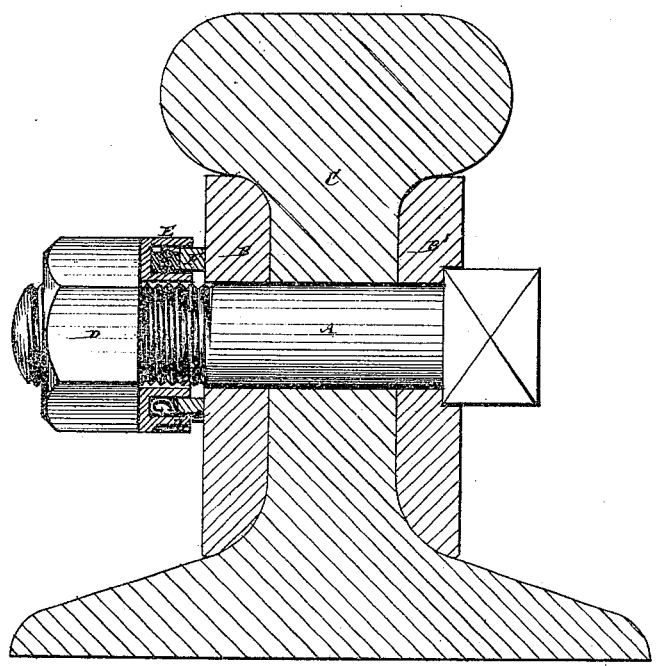
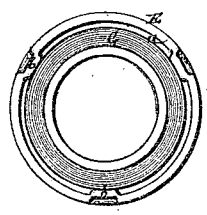
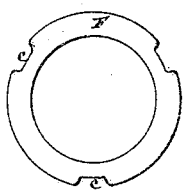
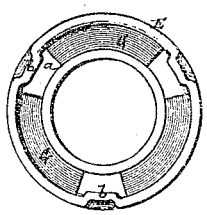

UNITED STATES PATENT OFFICE.

NATHAN THOMPSON, OF BROOKLYN, NEW YORK.

IMPROVEMENT IN WASHERS FOR SCREW-BOLTS.

Specification forming part of Letters Patent No. 100,214, dated February 22, 1870.

*To all whom it may concern:*

Be it known that I, NATHAN THOMPSON, of Brooklyn, in the county of Kings and State of New York, have invented a new and useful Improvement in Washers for Screw-Bolts and other Purposes, of which the following is a full, clear, and exact description, reference being had to the accompanying drawings, forming part of this specification, and in which—

Figure 1 represents a transverse section through a railroad-bar, with fish-plates applied thereto and secured by a screw-bolt having my improved washer on it; Figs. 2 and 3, inside face views of the cup portion of said washer under different modifications of the spring contained therein, and Fig. 4 a face view of the follower portion of the washer.

Similar letters of reference indicate corresponding parts.

The object of my invention is to construct a washer applicable to screw-bolts of ordinary make, whether used in connection with a nut or otherwise, and applicable to other purposes and uses, which, while possessing all the advantages of a solid metal washer, so far as its bearing-surfaces are concerned, is of a yielding or elastic character, in direction of its thickness, to compensate for the contraction and expansion of the parts to which it is applied, and to prevent jar from loosening the fastenings with which it is used. To illustrate this the improvement will here be described in connection with a screw-bolt and nut for securing the fish-joints of a railroad bar, the same consisting of a compound washer, the construction and arrangement of the parts of which relatively to each other, as hereinafter described, constitute the subject of the invention.

In the accompanying drawings, A represents a screw-bolt of ordinary construction applied to secure the fish-plates B B' of a railroad-bar, C, said bolt having at its one end a nut, D, with my improved washer applied thereto. This washer is made up of a metal or rigid cup or case portion, E, of annular form to surround the bolt, and with an annular recess, *a*, in it open at its one side or face; also, of a metal or rigid follower portion, F, of a suitable size to freely fit said annular recess, and having arranged between it and the back of the recess in the cup portion a spring or springs, G, of any suitable kind and material, but preferably of vulcanized india-rubber, either in a single piece or formed in detached sections.

Fig. 2 represents a single rubber spring, of ring form, arranged within the recess *a*; and Fig. 3, a divided sectional construction of the springs as made up of scraps or detached pieces of rubber. In some cases soft wood, cork, or metal springs of various kinds may be substituted for the rubber. It is not designed, however, that the springs should be subject to rubbing wear, for which purpose it is an essential feature of the invention that the cup portion E and follower portion F of the washer be connected or geared to turn in unison, but with freedom of play for the follower in and out of the recess *a*. It is also important, especially when a rubber spring or springs are used, that the latter be boxed in by the cup and follower portions of the washer to protect said spring or springs from oil and dirt or dust.

To insure the turning in common of the two parts of the washer and spring incased by them, with freedom of play for the follower in and out of the cup portion, as the same is acted upon by or operates to compress the spring, the one metal portion of said washer may be formed with side edge projections or protuberances *b* on it, and the other metal portion thereof with recesses *c* for such protuberances to fit or slide in and be guided by. Such construction may readily be given in stamping out or forming the portions E and F of the washer.

A washer thus constructed is at once cheap, simple, and efficient, and meets all the requirements consequent upon jar of the parts to which it is applied or expansion of the bolt without endangering the loosening of the bolt or nut, and dispensing with the wiring of the nut or use of a lock-nut. Hence, the improved washer may be applied with advantage, among other purposes or uses, to bolts in locomotives and other steam-engines.

What is here claimed, and desired to be secured by Letters Patent, is—

1. A compound washer consisting of a case or shell having an annular groove in one side of sufficient depth to contain the correspondingly-shaped annular follower, between which and the bottom of said groove is the interposed spring or packing, substantially as described.

2. The cup or case portion E, formed with a recess, *a*, open at its one side or face, in combination with a follower portion, F, arranged to fit said recess, and the two portions formed with one or more protuberances, *b*, and recesses *c* on their edges, and containing a spring or springs, G, in between them, essentially as shown and described.

NATHAN THOMPSON.

Witnesses:
  HENRY T. BROWN,
  J. W. COOMBS.